July 30, 1935. C. A. DUNHAM 2,009,387
EXHAUSTING APPARATUS
Original Filed Oct. 18, 1923 5 Sheets-Sheet 1
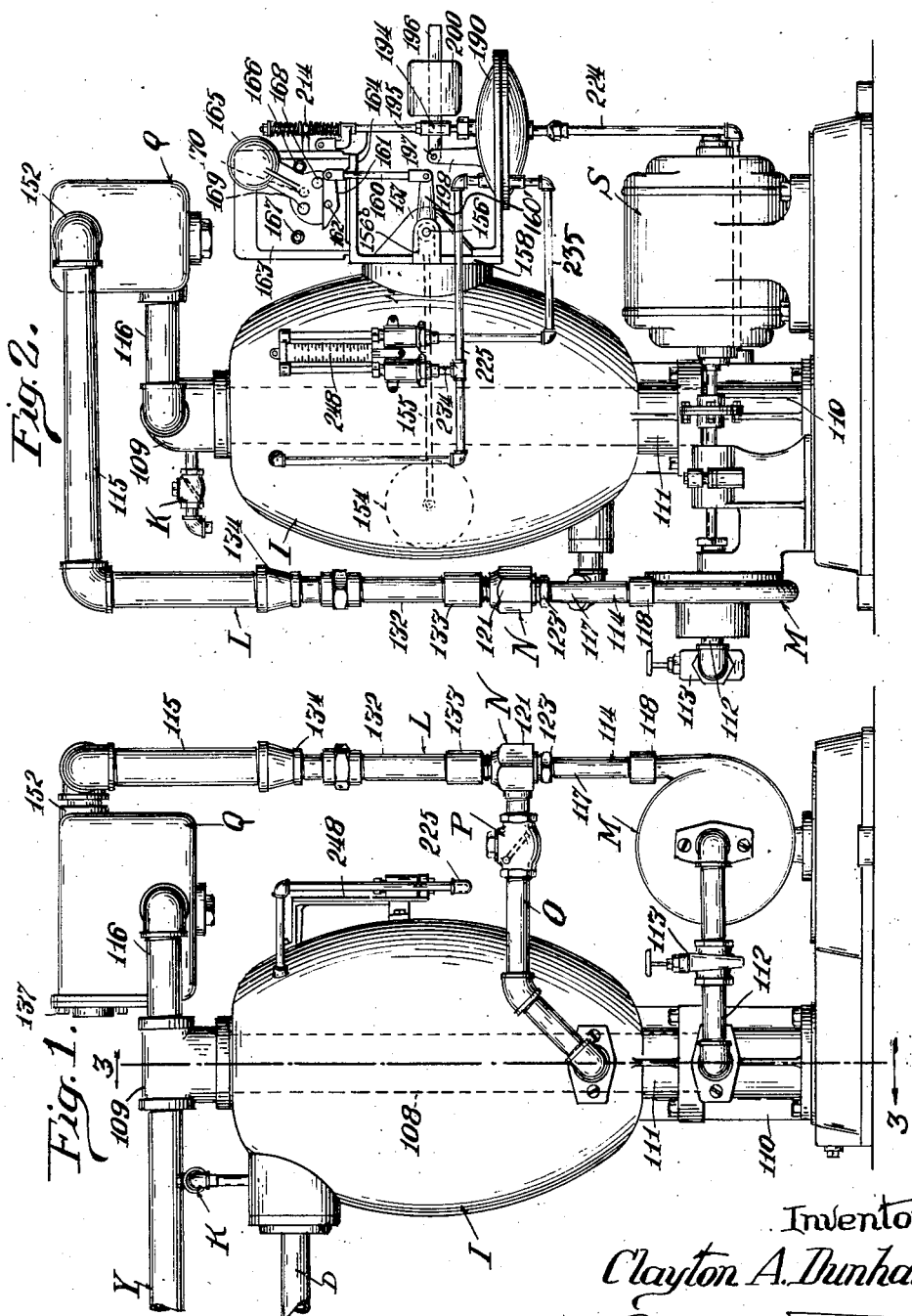
Inventor
Clayton A. Dunham
By
Attorneys.

July 30, 1935.  C. A. DUNHAM  2,009,387
EXHAUSTING APPARATUS
Original Filed Oct. 18, 1923  5 Sheets-Sheet 2
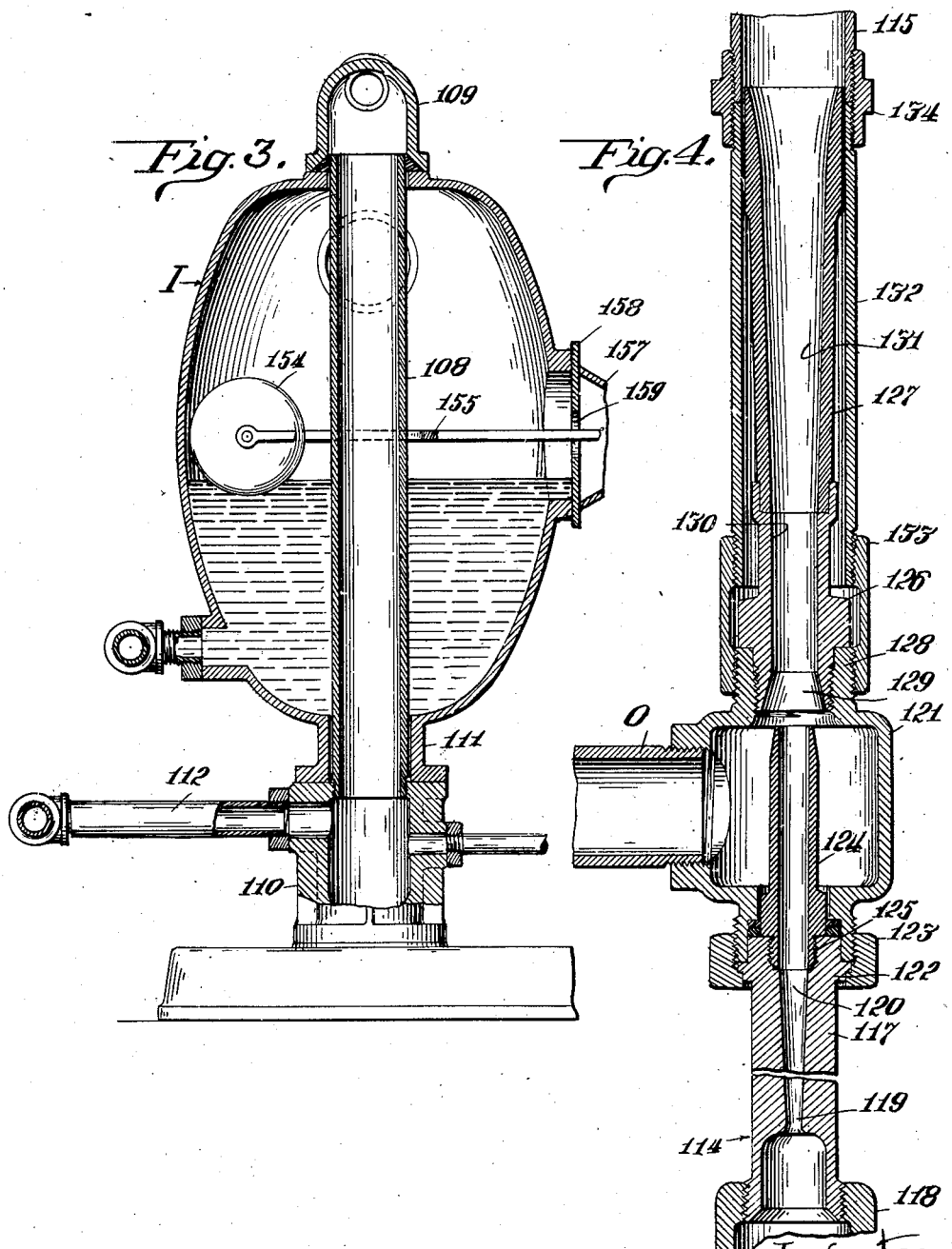
Inventor
Clayton A. Dunham
By Barnett Truman
Attorneys.

July 30, 1935.  C. A. DUNHAM  2,009,387
EXHAUSTING APPARATUS
Original Filed Oct. 18, 1923   5 Sheets-Sheet 3
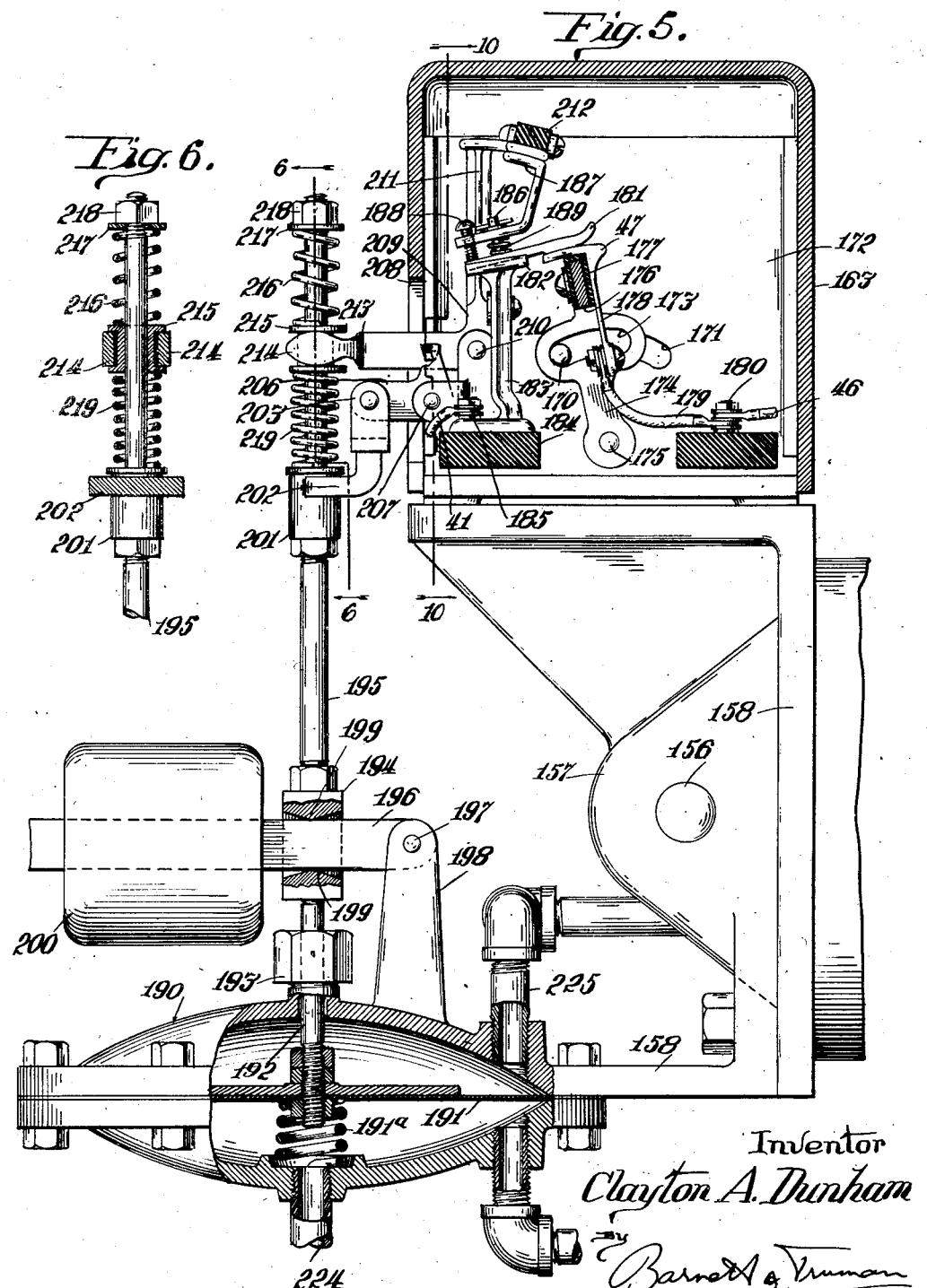

July 30, 1935. C. A. DUNHAM 2,009,387
EXHAUSTING APPARATUS
Original Filed Oct. 18, 1923   5 Sheets-Sheet 4
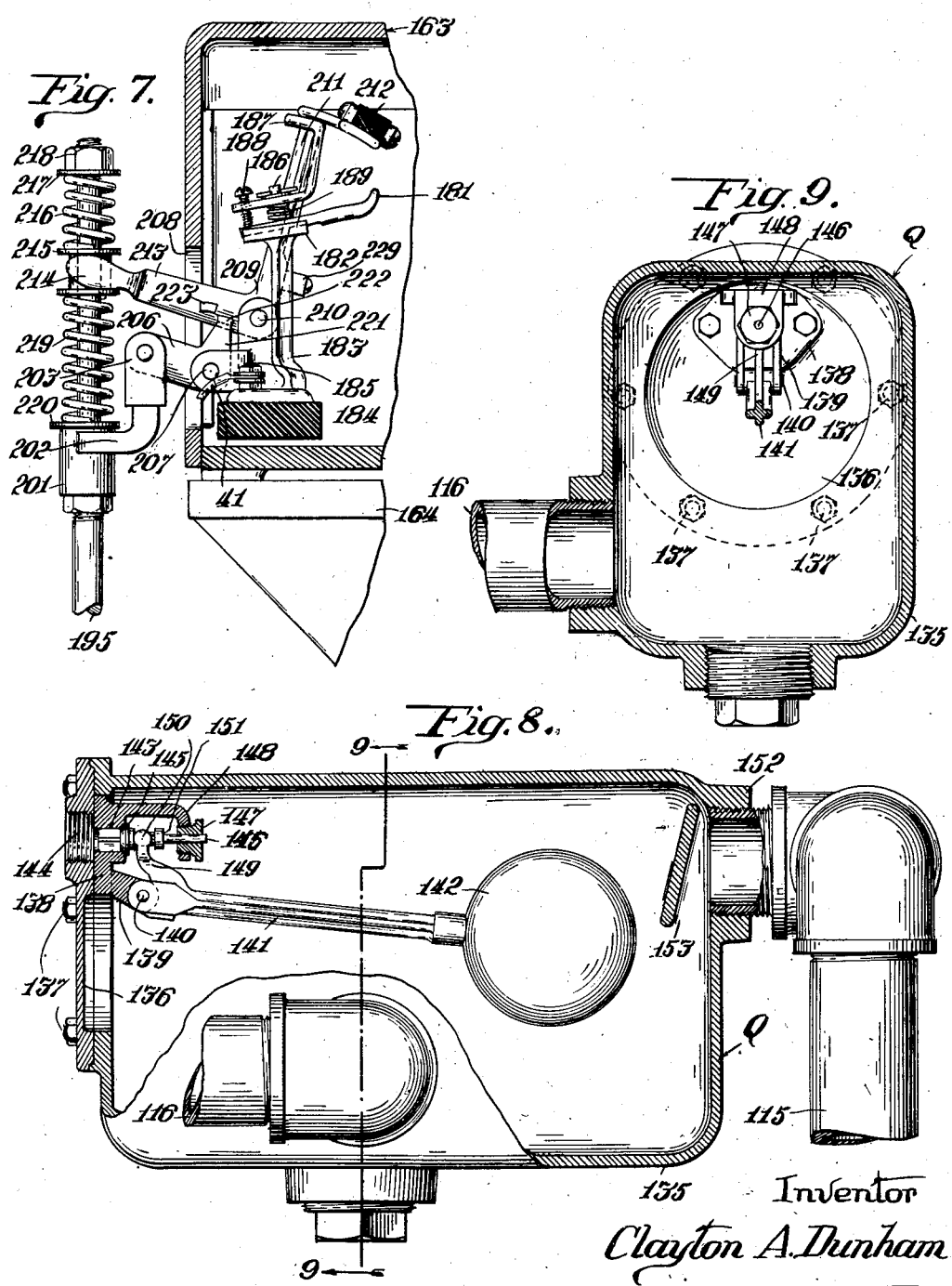
Inventor
Clayton A. Dunham
By Barnett & Truman
Attorneys.

July 30, 1935. C. A. DUNHAM 2,009,387
EXHAUSTING APPARATUS
Original Filed Oct. 18, 1923 5 Sheets-Sheet 5
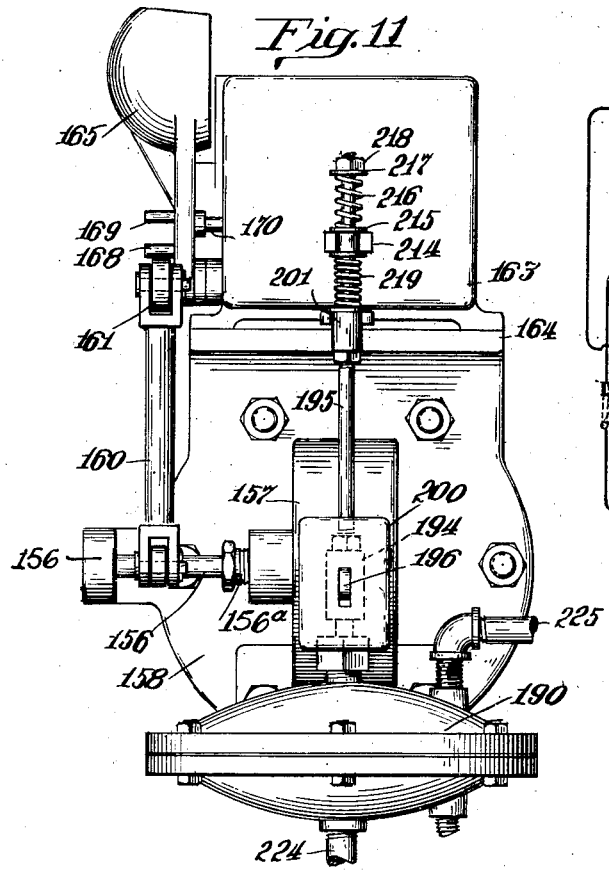
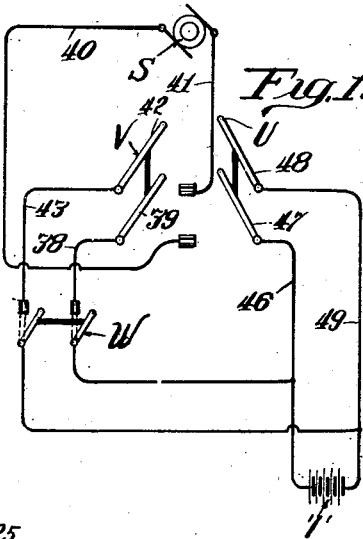
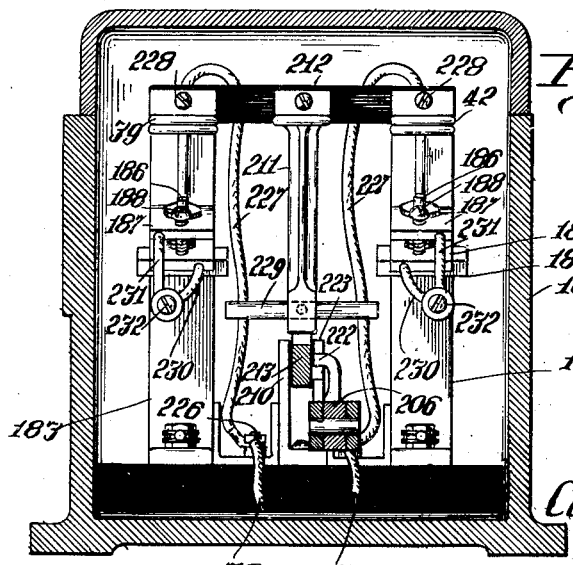
Inventor
Clayton A. Dunham
By Barnett & Truman
Attorneys Patented July 30, 1935

2,009,387

UNITED STATES PATENT OFFICE 2,009,387

EXHAUSTING APPARATUS

Clayton A. Dunham, Glencoe, Ill., assignor to C. A. Dunham Company, Marshalltown, Iowa, a corporation of Iowa Original application October 18, 1923, Serial No. 669,363. Divided and this application September 14, 1931, Serial No. 562,759

4 Claims. (Cl. 103—12)

This invention relates to an evacuating apparatus, and more particularly to an apparatus for creating a partial vacuum in a conduit or vessel or system of connected conduits, vessels or spaces by means of a circulating body of "hurling" water or other liquid so as to withdraw from said conduit or other space air or other gases, vapors, liquids or mixtures of gases and liquids.

One of the objects of the invention is to provide novel and improved means whereby, in the case of mixtures of gases and liquids, the gases drawn into the hurling circuit are eliminated therefrom.

Another object is to provide means for discharging excess liquid from the hurling circuit into a vessel or space under pressure.

A further object is to provide means whereby the discharge of liquid is made dependent automatically upon the accumulation of a certain amount of liquid in a receiver provided for the purpose of accumulating such liquid.

A further object is to provide means whereby the operation of the exhausting apparatus is made dependent upon the vacuum created in the space to be evacuated or, more particularly, dependent upon the difference in pressure as between this space and a higher pressure, so that the apparatus will operate to maintain a predetermined (though adjustable) minimum differential in pressure as between said spaces.

The invention consists of the new and improved constructions, arrangements and devices to be hereinafter described and claimed for carrying out the above stated objects and such other incidental objects as will be referred to in the following description of the preferred embodiment of the invention shown in the accompanying drawings.

This application is a division of the copending application of Clayton A. Dunham, Serial No. 669,363, filed October 18, 1923 now Patent No. 1,983,218, granted December 4, 1934. The present application shows that portion of the heating system disclosed in application Serial No. 669,363 which is concerned with the production of a vacuum, the control of the evacuating apparatus and the instrumentalities employed for separating air or gases from the water of the hurling circuit and delivering excess of water in the hurling circuit to the steam boiler. The heating system as such is not claimed herein, such heating system forming the subject matter of application Serial No. 669,363. The apparatus disclosed herein might obviously be employed either as a whole or with respect to certain features thereof otherwise than in connection with a steam heating system; in fact, in any situation where it is desired to withdraw gases, liquids or mixtures of gases and liquids from a conduit or space, separate the gases, if any, from the liquid and introduce the liquid into a vessel.

In the accompanying drawings:

Fig. 1 is a side elevation of the exhausting apparatus.

Fig. 2 is an end elevation, looking from the right at Fig. 1.

Fig. 3 is a vertical section, taken substantially on the line 3—3 of Fig. 1.

Fig. 4 is a longitudinal central section through the jet exhauster.

Fig. 5 is an enlarged elevation, partially in vertical section, through the differential controller mechanism for maintaining constant difference of pressure between the supply and return sides of the exhausting system.

Fig. 6 is a detail vertical section taken substantially on the line 6—6 of Fig. 5.

Fig. 7 is a detail sectional view of the upper portion of the mechanism shown in Fig. 5, but with the parts in a different position.

Fig. 8 is an elevation, partially in longitudinal vertical section, showing the device for venting air or gases from the hurling liquid circuit.

Fig. 9 is a transverse vertical section, taken substantially on the line 9—9 of Fig. 8.

Fig. 10 is a vertical section taken substantially on the line 10—10 of Fig. 5.

Fig. 11 is a side elevation of the mechanism shown in Fig. 5.

Fig. 12 is a wiring diagram showing the controlling circuits.

Referring first to Figs. 1 and 2, D is a pipe leading from a space to be evacuated of its fluid contents, air and water for example. I is a receiver for the fluid passing through pipe D. The receiver is provided with an outwardly opening check valve K. L indicates a hurling water pipe circuit, one leg of which extends through without communicating with the receiver I. In the circuit L is arranged a centrifugal pump M (although a reciprocating pump might be used instead) and a jet exhauster N, which latter operates to draw water from receiver I into the hurling circuit through pipe O provided with a check valve P opening in the direction of the jet exhauster. The hurling water circuit also contains a separating tank Q for eliminating air and gases from the hurling water. R is a controlling device for governing the motor S which operates pump M. This controller has a dual function.

It operates to start and stop the motor responsive to difference of pressure as between pipe D or receiver I and a predetermined higher pressure, such as the pressure in the hurling circuit, so as to maintain a substantially constant, but adjustable, pressure differential as between the contents of these spaces and to never permit this pressure differential to fall materially below a predetermined minimum. It also starts and stops the pump in accordance with changes in the water level in receiver I.

Referring for the moment to Fig. 12, T indicates a source of supply of current for the pump motor S, U a circuit breaker operating through control mechanism R by means of a float in vessel I, V a circuit breaker operated through controller R to maintain the aforementioned pressure differential, and W is a hand operated switch for putting the differential control into or out of action.

The hurling water circuit L is composed of a pipe 108 extending from top to bottom through the water tank I (but not in open communication therewith, a T 109 on the top of the tank, a hollow fitting 110 which supports the tank (the latter having a flanged neck 111 which rests upon the fitting 110), a pipe section 112 preferably provided with a shut-off valve 113, constituting the induction pipe of the centrifugal pump M, a pipe section 114 leading to the jet exhauster N, a pipe section 115 leading from the jet exhauster to the vent trap Q, and a pipe section 116 connecting the tank Q with the T 109. When the pump M is in operation, water is driven continuously through this hurling circuit as above described.

Water is drawn into the hurling circuit from tank I through pipe O and check valve P by means of the jet exhauster N (see Fig. 4) which is preferably constructed as follows: The jet nozzle of the exhauster comprises a member 117 secured by union 118 to the eduction pipe 114 of pump M and formed with a contracted throat at 119 and with a diverging passageway 120. A casing 121 is secured to the enlarged end 122 of jet member 117 by means of a union 123, pipe O being tapped into the side of this casing. Projecting through the casing is a nozzle member 124 having a threaded end 125 screwed into the end of nozzle member 117. The bore of nozzle member 124 is preferably of uniform diameter. The receiving tube of the jet exhauster is composed of two members 126, 127 having a tight fit one with the other, member 126 having a threaded connection with a boss 128 on casing 121. The throat of member 126 is flared as indicated at 129, the main portion of the bore 130 being of uniform diameter. The passageway 131 through member 127 is of gradually increasing cross sectional area as is common with jet exhausters. An enclosing pipe section 132 is secured to boss 128 by union 133 and to pipe section 115 by union 134. The water of the hurling circuit may be quite hot and as a result, if a jet exhauster of ordinary construction were used, diminution in kinetic energy of the jet would result from the tendency of the warm water to expand in throat 129. That is, with warm water and an ordinary nozzle in use instead of the one shown there would be less contraction of the jet issuing from nozzle member 124 than with cold water. By the construction shown the expansion is controlled in member 117 so that the heat released as a result of the pressure change within the nozzle is utilized to increase the kinetic energy of the water particles as a result of the expansive action and when the water issues from the straight portion of the nozzle, that is member 124, it comes in a coherent stream which passes across the suction space in casing 121 and enters the flared portion of member 126 as a homogeneous jet.

The separating tank Q for ridding the water of the hurling circuit of entrained air or gases preferably comprises a casing 135 provided at one end with a separately formed closure plate 136 secured to the body of the casing by bolts 137. Secured to the inside of the cover plate is a casting 138 provided with a forked bracket 139 to which is pivoted at 140 the arm 141 of a float 142. Casting 138 is formed with a port 143 in alignment with an opening 144 in the cover plate in which port is arranged a valve 145 having a stem 146 passing through a bushing 147 supported by a web 148 on casting 138. The float arm 141 has a finger 149 with a forked projection 150 straddling the valve stem 146 and bearing upon the valve 145 on one side and a collar 151 on the other. An accumulation of water in casing 135 will cause float 142 to close the port 143 thereby preventing the outflow of water through the vent 144. Pipe section 115, as above stated, leads to the casing of the trap, being shown as tapped into a boss 152 on one end of the casing. Preferably the casing is formed with an interior baffle web 153 arranged in front of the water inlet. Pipe 116 leads from the lower part of the casing 135 to the T 109.

The pipes 116 and Y normally lie below the water level in the closed vessel (for example the boiler of a heating system) into which the excess liquid is forced from the hurling circuit. Therefore there will normally be sufficient accumulation of water in casing 135 to hold the float 142 elevated, as shown in Fig. 8, with the vent valve 145 closed. Air and other non-condensable gases from the hurling circuit will accumulate in the upper portion of separating tank 135, and when a sufficient quantity of these gases have been collected in this tank the water level will be forced down thereby thus permitting float 142 to open the valve 145 and permit the escape of a portion of these gases. The excess water which is drawn into the hurling circuit from tank I is forced from the circuit through T 109 and through pipe Y.

The motor S which intermittently drives pump M is controlled through changes in the level of the water accumulated in tank I by the float controlled mechanism which is preferably constructed as follows (see particularly Figs. 2, 3, 5, 10, 11 and 12): 154 is a float in the tank I arranged on an arm 155 which is secured to a shaft 156 within the housing extension 157 formed on a plate 158 secured to the side of the tank I, the lever passing through an opening 159 in plate 158 to the inside of the tank. The shaft 156 is journaled in a stuffing box 156ᵃ through which it projects from housing 157 and in a bracket arm 156ᵇ formed on plate 158. A crank arm 160' on shaft 156 is connected by a link 160 with a trip 161 which latter is pivoted at 162 to the side of a casing 163 which is supported on a shelf 164 projecting outwardly from plate 158. On pivot stud 162 is mounted a weight 165 adapted to be moved back and forth between stops 166 and 167. The weight is provided with a pair of studs 168, 169 adapted to be engaged by the trip 161. The weight 165 is provided with a stud 170 which projects through a slot 171 in the side wall 172 of casing 163 (Fig. 5) and through a slot 173 in a rocking member 174 which is pivoted at 175 to the side wall 172 of the casing. The rocking member 174 is provided with a cross bar 176 on which is arranged, with the interposition of suitable insulation 177, a pair of contact shoes 47, 48 (diagrammatically shown in Fig. 12). The contact shoes 46, 47 are provided with extensions 178 connected by conductors 179 to binding posts 180. The line wires 46, 49 (Fig. 12) are connected with the binding posts 180. The shoes 47, 48 are adapted to bear against a pair of contacts 181 supported on inclined ledges 182 on the upper ends of standards 183 mounted on an insulating block 184 in the casing. On the standards 183 are binding posts 185 to which are connected the pump motor leads 40 to 41. The contacts 181 are held in place on the standards by means of guide studs 186 fixed to the ledges 182 and extending loosely through the contacts and through an upper pair of contacts 187 (for the differential control) and by set screws 188 extending through the upper and lower contacts and into the ledges 182, coiled springs 189 being interposed between the upper and lower contacts of each pair. With this arrangement a yielding pressure is exerted between the contact shoes 47 and 48 and contacts 181, and also between the coacting pairs of contacts for the differential control to be hereinafter described.

*Operation of the float control.*—When the level of the water in tank I falls, the float lever 155 is rocked raising link 160 and bringing trip 161 against stud 168 on the tilting weight 165. The weight is thus swung from right to left (Fig. 2) until it passes the vertical, whereupon it falls to the left until stopped by the bumper or stop member 167. This falling movement of the weight brings stud 170 (Fig. 5) against the right-hand end of slot 173 in the rocking switch member 174, thus rocking the switch member to the right so as to separate contact shoes 47, 48 from the cooperating pair of contacts 180 by a quick snap movement. With the contact shoes 47, 48 bearing against the contacts 181 the pump leads 40, 41 are connected with the line wires 46, 49 as indicated by the diagram (Fig. 12). When this circuit is broken as above described, the pump motor is stopped unless it is receiving current over the circuit controlled by the pressure differential controlled mechanism which will next be described.

The differential control mechanism for controlling the pump motor S so as to maintain a desired difference of pressure as between the space from which fluids are withdrawn, and the space into which liquid is forced is preferably constructed as follows (see Figs. 2, 5, 6, 7, 10 and 11): 190 is a diaphragm casing supported on the bracket plate 158 on the side of tank I. The casing contains a flexible diaphragm 191 under which is arranged a spring 191ª, a rod 192 being fixed to the diaphragm and extending through a stuffing box 193 and attached to a yoke 194, the upper end of which carries a rod 195. A lever 196 is pivoted at 197 to a standard 198 on the diaphragm casing and extends through yoke 194 which has knife edge bearings 199 on which the lever fulcrums. The lever 196 carries a weight 200. Fixed to rod 195 is a collar 201 having a curved arm 202 provided with a forked end 203 connected to a bellcrank 206 pivoted at 207 to the casing 163, the bellcrank extending into the casing through a slot 208 in the side thereof. A second bellcrank 209 is pivoted to a bracket 210 in the casing and to the upper end of the upstanding arm 211 of this bellcrank is secured a cross bar 212 carrying contact shoes 39, 42 (diagrammatically shown in Fig. 12), which are adapted to bear against the pair of contacts 187 previously described. The other arm 213 of the bellcrank projects out through slot 208 in the side of casing 163 and has a forked portion 214 with rounded edges engaging a collar 215 slidably arranged on rod 195 between a coiled spring 216 held against a washer 217 positioned by nut 218 on the upper end of the rod, and a longer coiled spring 219 bearing against a washer 220 positioned against the fixed collar 201. The upstanding arm 221 of bellcrank 206 has a hook 222 which is adapted to extend over a lug 223 on the arm 213 of bellcrank 209. The lower compartment of the diaphragm casing 190 is connected by a pipe 224 with the high pressure side of the system at some convenient point, the pipe being shown as extending into the fitting 110 which forms part of the hurling circuit. The upper compartment of the diaphragm casing 190 is connected with the low pressure side of the apparatus by a pipe 225 which is shown as tapped into the tank I.

Line wires 38, 43 are connected with binding posts 226 (Fig. 10). From these binding posts extend a pair of wires 227 to the binding posts 228 on the contact shoes 39, 42, wires 227 being guided by a cross member 229 on the bellcrank 211. In order to insure proper electrical connection between the standards 183 and the contacts 181 and 187, wires 230 and 231 are provided which extend to these contacts respectively from binding posts 232 on the standards.

*Operation of the differential control mechanism.*—The differential control is put into or out of operative connection with the apparatus by closing or opening hand operated switch W (Fig. 12). So long as the difference in pressure between the high and low pressure spaces is less than that which the apparatus is intended to maintain, the contact shoes 39, 42 bear upon contact members 187 so that the pump motor is supplied with current through line wires 36, 38 and 43, 45, and motor leads 40, 41. With switch W closed the system is subject to the differential control regardless of whether the float controlled switch U is opened or closed. If the balance of pressures on diaphragm 191 is disturbed either by increase of pressure under the diaphragm or by diminution of pressure above the same to increase the pressure differential over that for which the controller is set, the diaphragm is deflected upwardly against the action of weight 200, the position of which on lever arm 196 determines the pressure differential to be maintained. The upward movement of rod 195 rocks the bellcrank 206 but without disturbing the position of bellcrank 209 so long as the hook 222 bears upon the lug 223 on bellcrank 209. During this initial upward movement of rod 195 spring 216 is compressed. The spring 219 is in fact compressed to a certain extent when the parts are in the intermediate position shown in Fig. 5. As soon as the upward movement of the rod releases the hook 222 from the lug 223, bellcrank 209 is given a sudden rocking movement by the force of spring 219 which moves the contact shoes 39, 42 away from contact 187 with a snap action, thus preventing arcing. The spring 219 which is compressed more than spring 216 gives sleeve 215 a movement of greater amplitude than the vertical movement of rod 195 to effect a sufficiently wide separation of the contact as shown in Fig. 7. The pump motor circuit governed by the differential controlling mechanism is now broken and the motor stopped, unless there is an excess of water in tank I, in which case the pump will continue to operate because of the closed position of the float controlled switch U.

When the balance of pressures on diaphragm 191 is restored, rod 195 is moved back to its normal position. During the first part of this movement hook 222 passes under lug 223 keeping the contacts in their separated position and compressing spring 226. When the hook clears the lug, bellcrank 209 is given a quick movement through action of spring 216 which moves the contact shoes 39, 42 against contacts 187 closing this circuit.

The apparatus is preferably provided with a gauge 248 (Fig. 2) by which the difference in pressure between the high and low pressure sides of the system may be ascertained. This gauge is connected through pipes 234 and 225 with the low pressure side of the system and through pipe 235 with the high pressure side.

The operation of this exhausting apparatus may be summarized as follows: Circulation of liquid through the hurling circuit L, brought about by the operation of pump M, creates a partial vacuum in the exhausting chamber 121 of the jet exhauster N which draws fluids from the receiver I through pipe O. This creates low pressure in the receiver I producing the evacuation of pipe D and the space connected therewith. Any air drawn into the hurling circuit L is eliminated through vent 143 of the separating tank Q. This vent is closed by operation of float 142 before water in the tank can rise to the level of the vent. Check valve K allows the escape of any accumulated air pressure in receiver I while preventing the inflow of air when receiver I is under a vacuum. Excess of water drawn into the hurling circuit L from receiver I passes out through discharge pipe Y.

Whenever the water in the receiver I accumulates to a certain level, float 154 sets the pump motor in operation so as to bring about discharge of water from the receiver through the hurling circuit and discharge pipe Y. When the differential pressure control is made operative through closing of hand operated circuit breaker W, the pump is kept in operation whether there be any water in the receiver I or not to bring about the continued evacuation of pipe D so long as the difference in pressure as between the inlet and discharge sides of the system does not exceed the differential at which the controller is set to operate. Under the conditions last mentioned, that is with no accumulation of water in receiver I, air and water or possibly air alone will be drawn into the hurling circut through pipe O. The air is eliminated through vent 143 of the air separating tank which now comes into play. Inasmuch as the horizontal discharge pipe Y is at or below the water level of the vessel into which water is discharged, the hurling circuit is kept filled with water without regard to accretion from vessel I.

When the pressure differential exceeds that for which the controller is set, the pump is stopped until the desired pressure differential is reestablished, provided however that no stoppage of the pump takes place if and so long as the water level in the receiver I is high enough to require the discharge of water therefrom. When the pump is not operating, check valve P prevents water backing through pipe O into receiver I.

It will be noted that this improved evacuating apparatus and its control mechanism is so regulated that it shall operate at such times, and only at such times, as may be necessary to maintain a desired pressure differential between two spaces, and to expel an excessive accumulation of liquid from the system. When the evacuating apparatus is in operation, both of these functions may be performed simultaneously. Ordinarily the intermittent operation of the apparatus for the purpose of maintaining the desired pressure differential will also be sufficient to withdraw the accumulated liquid and expel from the system the excess quantity not needed for the hurling circuit. However, there may be occasions when an excessive accumulation of liquid must be forced out from the pumping system even though the necessary pressure differential has already been established. On the other hand, it may be necessary to operate the evacuating apparatus for the purpose of maintaining the pressure differential even though there is no excessive quantity of liquid accumulated in the system. A single automatically operating control apparatus for the motor is provided whereby the operation of the motor, and consequently of the evacuating apparatus, is made responsive both to changes in the pressure differential and also to changes in the liquid level in the receiving receptacle. The motor will be automatically caused to function whenever the operation of the evacuating means is desirable for maintaining either or both the predetermined pressure differential and the desired liquid level in the receiver. At all other times the apparatus does not operate. Air and non-condensable gases will be automatically discharged from the system as they accumulate therein. If, by any chance, gases should accumulate in the receiver I so as to produce a pressure therein above atmospheric, these gases will automatically escape through the vent valve K. Ordinarily the pressure in receiver I will be below atmospheric and the vent K will remain closed. At such times gases will be drawn into the hurling circuit through pipe O and the jet exhauster N along with the liquid, and will then accumulate in the separating tank Q until a sufficient quantity has collected therein to lower the water level and open the vent 144, whereupon a portion of these gases will escape.

It will thus be apparent that this improved evacuating apparatus operates automatically to either simultaneously or separately as conditions may require perform all of the following functions: (1) Withdraw all fluids, both gases and liquids from a first space; (2) maintain the pressure in this first space lower, by a predetermined pressure differential than the pressure in a second space; (3) propel into the second space the excess liquid withdrawn from the first space and not required for the operation of the hurling circuit in the evacuating apparatus; (4) vent from the system all gases withdrawn from the first space.

I claim:

1. In combination, an evacuating apparatus comprising a closed hurling circuit, a jet exhauster in the circuit, and a pump in the circuit for causing a flow of liquid through the exhauster, means for driving the pump, a receiver in which liquid is accumulated, a conduit leading from the receiver to the exhauster through which conduit fluids are drawn from the receiver into the hurling circuit, means for venting gases from the circuit, means including a conduit leading from the hurling circuit for discharging excess liquid from the circuit, and controlling mechanism for the pump driving means, said mechanism including means for starting the pump whenever the pressure differential between the receiver and hurling circuit has fallen below a predetermined minimum or whenever a predetermined volume of liquid has accumulated in the receiver, and for stopping the pump when both the pressure differential has been reestablished and the excess liquid has been withdrawn from the receiver.

2. In combination, an evacuating apparatus comprising a closed hurling circuit, a jet exhauster in the circuit, and a pump in the circuit for causing a flow of liquid through the exhauster, means for driving the pump, a receiver in which liquid is accumulated, a conduit leading from the receiver to the exhauster through which conduit fluids are drawn from the receiver into the hurling circuit, means for venting gases from the circuit, means including a conduit leading from the hurling circuit for discharging excess liquid from the circuit, and controlling mechanism for the pump driving means, said mechanism including means for starting the pump whenever the pressure in the receiver has risen above a predetermined maximum or whenever a predetermined volume of liquid has accumulated in the receiver, and for stopping the pump when both the pressure in the receiver has been lowered below the predetermined maximum and the excess liquid has been withdrawn from the receiver.

3. In combination, an evacuating apparatus comprising a closed hurling circuit, a jet exhauster in the circuit, and a pump in the circuit for causing a flow of liquid through the exhauster, means for driving the pump, a receiver in which liquid is accumulated, a conduit leading from the receiver to the exhauster through which conduit fluids are drawn from the receiver into the hurling circuit, means for venting gases from the circuit, means including a conduit leading from the hurling circuit for discharging excess liquid from the circuit, and controlling mechanism for the pump driving means, said mechanism including a controller responsive to pressure changes in the receiver, and a second controller responsive to changes in liquid level in the receiver, said evacuating apparatus being started by operation of either controller but stopped only when both controllers are in stopping positions.

4. In combination, an evacuating apparatus comprising a closed hurling circuit, a jet exhauster in the circuit, and a pump in the circuit for causing a flow of liquid through the exhauster, means for driving the pump, a receiver in which liquid is accumulated, a conduit leading from the receiver to the exhauster through which conduit fluids are drawn from the receiver into the hurling circuit, means for venting gases from the circuit, means including a conduit leading from the hurling circuit for discharging excess liquid from the circuit, and controlling mechanism for the pump driving means, said mechanism including a controller operable to start or stop the pump as the pressure in the receiver respectively rises above or falls below a predetermined pressure, and a second controller operable to start or stop the pump as the liquid level in the receiver respectively rises above or falls below certain predetermined levels, said controlling mechanism functioning to start the evacuating apparatus by operation of either controller, but stopping the evacuating apparatus only when both controllers are in stopping position.

CLAYTON A. DUNHAM.